United States Patent [19]
Lin et al.

[11] Patent Number: 5,898,505
[45] Date of Patent: Apr. 27, 1999

[54] RESOLUTION ENHANCEMENT PROCEDURE AND APPARATUS FOR A COLOR LASER PRINTER

[75] Inventors: Qian Lin, Santa Clara, Calif.; Brian Hoffmann; Jeffrey L. Trask, both of Boise, Id.

[73] Assignee: Hewlett-Packard Company, Palo Alto, Calif.

[21] Appl. No.: 08/788,767

[22] Filed: Jan. 24, 1997

[51] Int. Cl.⁶ .................................................. H04N 1/405
[52] U.S. Cl. ......................... 358/298; 358/457; 382/270; 395/109
[58] Field of Search .................................... 358/298, 455, 358/457, 456; 382/270; 395/109; 347/240, 351, 131, 254

[56] References Cited

U.S. PATENT DOCUMENTS

| | | | |
|---|---|---|---|
| 5,317,418 | 5/1994 | Lin ........................................... | 358/456 |
| 5,442,459 | 8/1995 | Gahang .................................... | 358/433 |
| 5,444,551 | 8/1995 | Miller et al. ............................. | 358/456 |
| 5,454,052 | 9/1995 | Kojima .................................... | 382/233 |
| 5,469,515 | 11/1995 | Lin ........................................... | 382/237 |
| 5,557,709 | 9/1996 | Shu .......................................... | 395/109 |
| 5,586,203 | 12/1996 | Spaulding et al. ...................... | 382/270 |
| 5,696,602 | 12/1997 | Copper et al. ........................... | 358/457 |
| 5,701,366 | 12/1997 | Ostromoukhov et al. .............. | 382/237 |
| 5,708,518 | 1/1998 | Parker et al. ............................ | 358/534 |
| 5,710,827 | 1/1998 | Perumal, Jr. et al. ................... | 382/167 |

*Primary Examiner*—Peter S. Wong
*Assistant Examiner*—Gregory J. Toatley, Jr.

[57] ABSTRACT

A print apparatus performs a halftoning action on a raster pixel image. The print apparatus includes a super-pixel data base for storing plural n×n superpixels, each superpixel corresponding to a subset (or "bucket") of gray level pixel values. The method comprises the steps of: logically tiling a dither matrix across the raster pixel image and outputting a threshold value which, logically and positionally corresponds to a given image pixel value. The given image pixel value is then quantized into a selected bucket of pixel values which encompass the given image pixel value. A proportionality value is then determined which identifies the relative position of the given image pixel value within the selected bucket of pixel values. The outputted threshold value is then compared to the determined proportionality value, and the selected bucket number is incremented to a next sequential bucket number if the proportionality value exceeds the threshold value. A superpixel is next selected that is identified by the selected bucket number or the next sequential bucket number, as the case may be. A superpixel includes plural halftone pixel values and the method selects one of those halftone pixel values that is positioned at a location determinable from the coordinates of the given image pixel value. The selected halftone pixel value from the superpixel is then passed to the print engine of the printer for rendering. The method of the invention is carried out, preferably, by an application specific integrated circuit so as to enable high speed halftoning of the raster image.

7 Claims, 3 Drawing Sheets

RESOLUTION ENHANCEMENT PROCEDURE AND APPARATUS FOR A COLOR LASER PRINTER

FIELD OF THE INVENTION

This invention relates to a method and apparatus for enabling a color laser printer to produce halftone images through use of multi-gray level pixels and, more particularly, to a method for producing such halftone images via a multi-stage dither procedure.

BACKGROUND OF THE INVENTION

Color and gray value images are both composed of picture elements (pixels), each pixel represented by multiple binary bits which define either a color or a gray level. In order to represent such an image on a bilevel (black/white) printer, the pixel data, if not already gray level, is converted into a gray level multi-bit value (i.e., 8 bits per pixel). The individual gray level pixels are then converted to binary level pixels through use of a scaling and dithering process. The dithering process provides a halftone-like texture to selected areas of the image so as to provide gray value variations therein.

The dither process compares individual pixel values against correspondingly located values in a threshold matrix, to control the conversion of the gray level values to appropriate patterns of bi-level data. When 8-bits are employed, 256 gray levels can be represented by the digital values. The threshold matrix comprises a plurality of row-arranged, gray level values which control the conversion of the gray level pixel values to binary pixel values. In essence, each entry in the threshold matrix is a threshold gray level value, which, if exceeded by the image gray level pixel value, causes that gray level image pixel to be converted to a black pixel. If, by contrast, the image gray level pixel value is less than or equal to corresponding threshold matrix gray level value, it is rendered as a "white" pixel.

During a dithering process, the threshold matrix is "tiled" across the image pixels to enable each gray level image pixel to be compared against a correspondingly, logically-positioned, gray level value in the threshold matrix.

Laser printing devices have now become available which are capable of providing "n" levels of gray (including white) at each pixel site, with n being greater than 2. Often, n is a value from 4 to 8. Hereafter, it is to be understood that when the term "gray" is used, it applies to both color and black/white images and, when applied to a color image, relates to the intensity of the color on a scale of 0 to N−1 where N is the greatest value obtainable from the number of bits used to represent the color. In the case of 8 bits, N=256.

Clearly, if a laser printer is able to produce all N levels of a color, then no need exists to halftone the image, as all gray levels can be fully represented in the rendering. However, there is a countervailing requirement to reduce printer costs. Thus, the amount of data used to represent a pixel is often limited to just a few bits per pixel, per color plane, to reduce the amount of required memory. Nevertheless, a requirement still exists for a compromise solution between continuous tone printing (having a high spatial frequency) and printing which employs a limited number of levels of gray (and exhibiting a lower spatial frequency).

Accordingly, it is an object of this invention to provide a dither/halftone procedure for a multi-gray level printer apparatus which enables the apparatus to produce near photographic quality images.

It is another object of this invention to provide an improved method for halftoning a multi-gray level image wherein marking engine artifacts, and rendering artifacts are minimized.

It is yet another object of this invention to provide an improved method and apparatus for halftoning a multi-gray level image wherein halftoning procedures are individually adjustable, for each of plural image color planes.

SUMMARY OF THE INVENTION

A print apparatus performs a halftoning action on a raster pixel image. The print apparatus includes a super-pixel data base for storing plural n×n superpixels, each superpixel corresponding to a subset (or "bucket") of gray level pixel values. The method comprises the steps of: logically tiling a dither matrix across the raster pixel image and outputting a threshold value which, logically and positionally corresponds to a given image pixel value. The given image pixel value is then quantized into a selected bucket of pixel values which encompass the given image pixel value. A proportionality value is then determined which identifies the relative position of the given image pixel value within the selected bucket of pixel values. The outputted threshold value is then compared to the determined proportionality value, and the selected bucket number is incremented to a next sequential bucket number if the proportionality value exceeds the threshold value. A superpixel is next selected that is identified by the selected bucket number or the next sequential bucket number, as the case may be. A superpixel includes plural halftone pixel values and the method selects one of those halftone pixel values that is positioned at a location determinable from the coordinates of the given image pixel value. The selected halftone pixel value from the superpixel is then passed to the print engine of the printer for rendering. The method of the invention is carried out, preferably, by an application specific integrated circuit so as to enable high speed halftoning of the raster image.

DETAILED DESCRIPTION OF THE INVENTION

Figure 1:
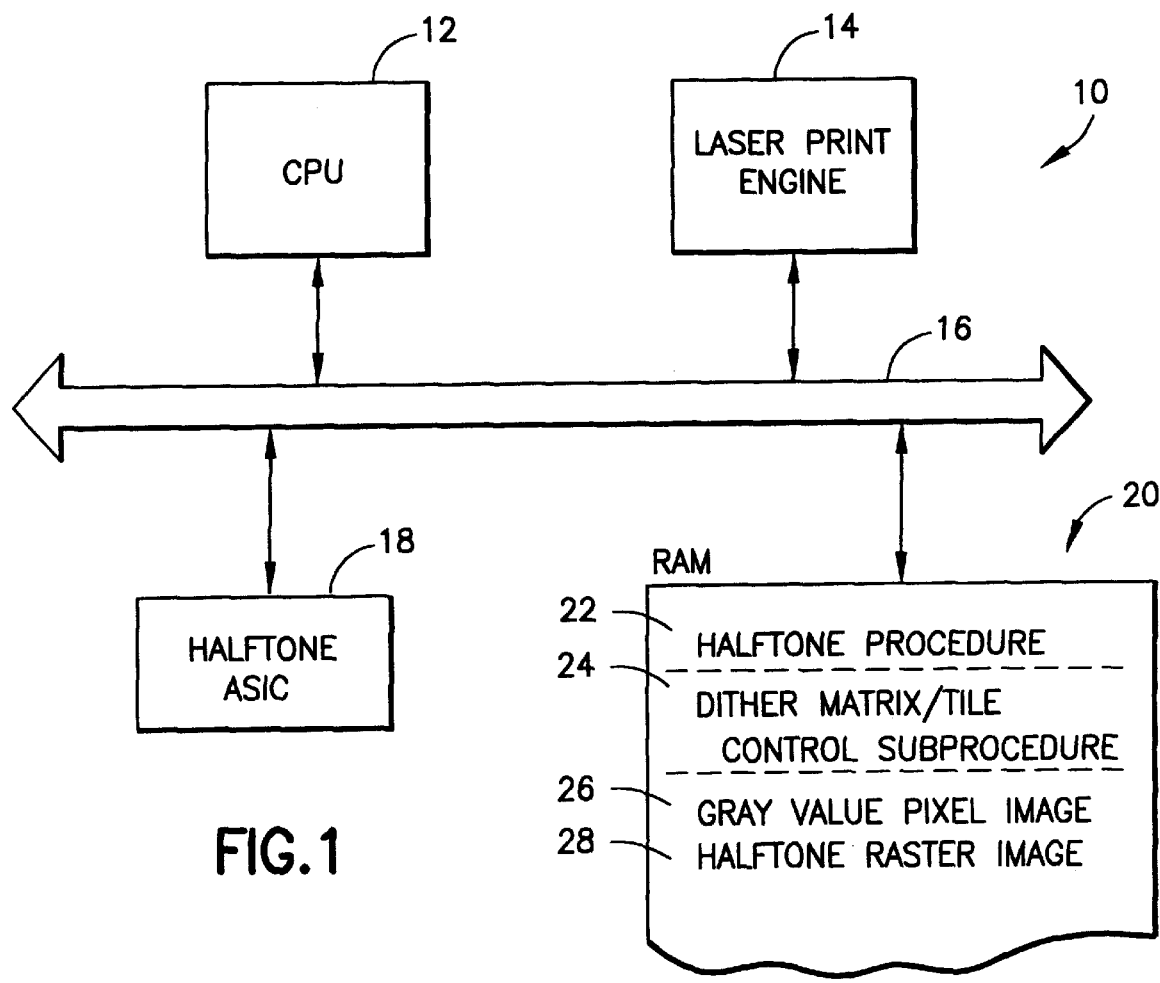
FIG. 1 is a block diagram of a laser print engine incorporating the invention hereof.

FIG. 1 is a block diagram of a laser printer that incorporates the invention hereof. It is to be understood that while a laser printer will be hereinafter described, the invention is equally applicable to any device which utilizes multi-gray level pixels to render a halftone image. More specifically, such devices include laser printers, copiers, facsimile devices, plotters, computer monitors, etc.

Laser printer 10 comprises a central processing unit (CPU) 12 and a laser print engine 14, interconnected via a bus 16. A halftone application-specific integrated circuit (ASIC) 18 is interconnected to bus 16 and provides the hardware functionality needed to perform high speed halftoning of a multi-level gray value pixel image. It is to be understood, however, that the functions performed by ASIC 18 can be performed through software control, but at a lower rate of speed.

A random access memory (RAM) 20 includes procedures and data necessary to enable CPU 12 and ASIC 18 to carry out the halftoning functions of the invention. More specifically, RAM 20 includes a halftone procedure 22, a dither matrix and tile control subprocedure 24 and a gray value pixel image 26 (as received, for instance, from a host processor, not shown). Gray value pixel image 26 is to be altered by the invention into a halftone raster image 28 that is suitable for rendering by laser print engine 14.

It is to be understood that while the aforesaid procedures and data are maintained, for purposes of this explanation, in RAM 20, certain thereof can be included in a read-only memory which also stores control firmware for printer 10.

Gray value pixel image 26 represents each pixel by a multi-bit gray value. If the image is a color image, it is often represented by 4 color planes, with 3 of the color planes representing cyan, magenta and yellow color values, respectively. Each color pixel value in each plane (including black) is represented, for instance, by 8 bits. Thus, there are a total of 32 bits per pixel in grey value pixel image 26.

Because of cost requirements, memory in RAM 20 is limited, thereby requiring each pixel in halftone raster image 28 to be represented by a limited number of bits per pixel, per color plane. As a result, laser print engine 14 is limited in the number of different levels of modulation that can be applied to its laser beam. Thus, while laser print engine 14 might be capable of providing many levels of modulation, the number of levels of modulation are limited by the number of bits per pixel in halftone raster image 28.

Figure 2:
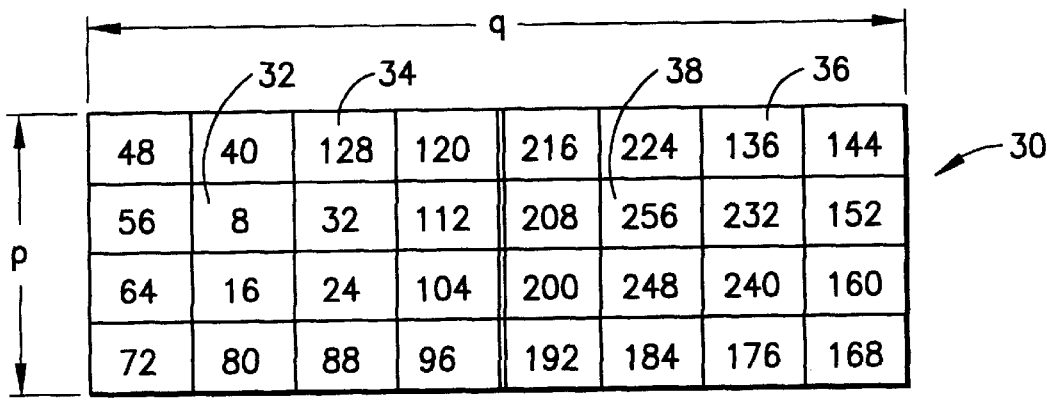
FIG. 2 is a schematic representation of an exemplary threshold dither matrix.

FIG. 2 illustrates a representative dither matrix 30 which is substantially simplified from that actually used in practice. Dither matrix 30 comprises a p×q matrix of threshold values, each threshold value representing a level which must be exceeded by a positionally corresponding image pixel value for that image pixel value to be represented by a non-white halftone pixel in raster image 28. The arrangement of threshold values in dither matrix 30 is selected in accordance with known dither patterns. As an example, the lowest threshold value in dither matrix 30 resides in matrix position 32, with additional threshold values spiraling in a generally outward direction until dither matrix position 34 is reached. Thereafter, the threshold values spiral inwardly, commencing at dither matrix position 36 and ending at dither matrix position 38. Other dither matrix arrangements are also within the scope of this invention.

Figure 3:
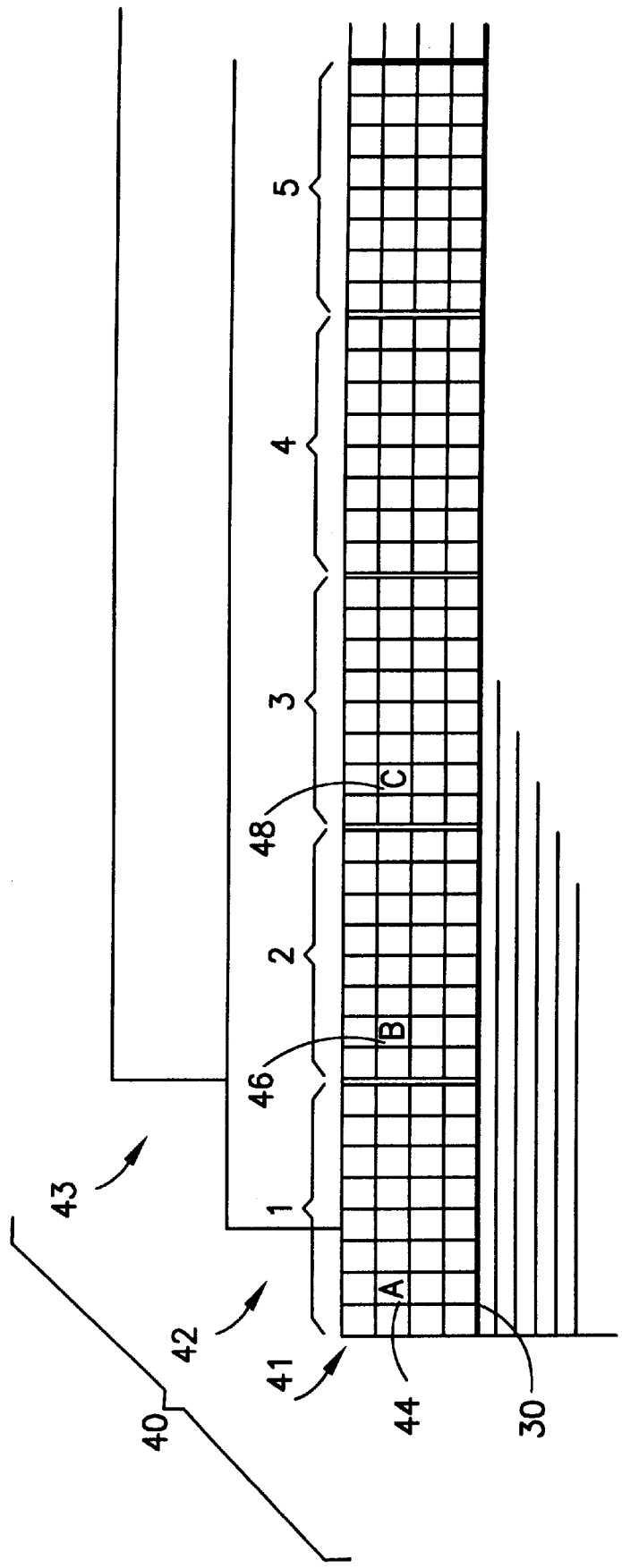
FIG. 3 is a schematic representation illustrating a logical tiling of the threshold dither matrix of FIG. 2 across an image of multi-level gray value pixels.

Prior to describing the detailed procedure of the invention and the functions carried out by halftone ASIC 18, reference should be made to FIG. 3 wherein a pixel image 40 includes multiple pixels, each pixel represented, for instance, by corresponding pixel locations in 3 color planes 41, 42, 43. Each pixel in each color plane is represented, for instance, by an 8-bit color value. Dither matrix 30 is tiled over the entirety of each color plane of image 40 by being logically stepped across a color plane in a sequential, raster manner until all color planes have been tiled.

Figure 4:
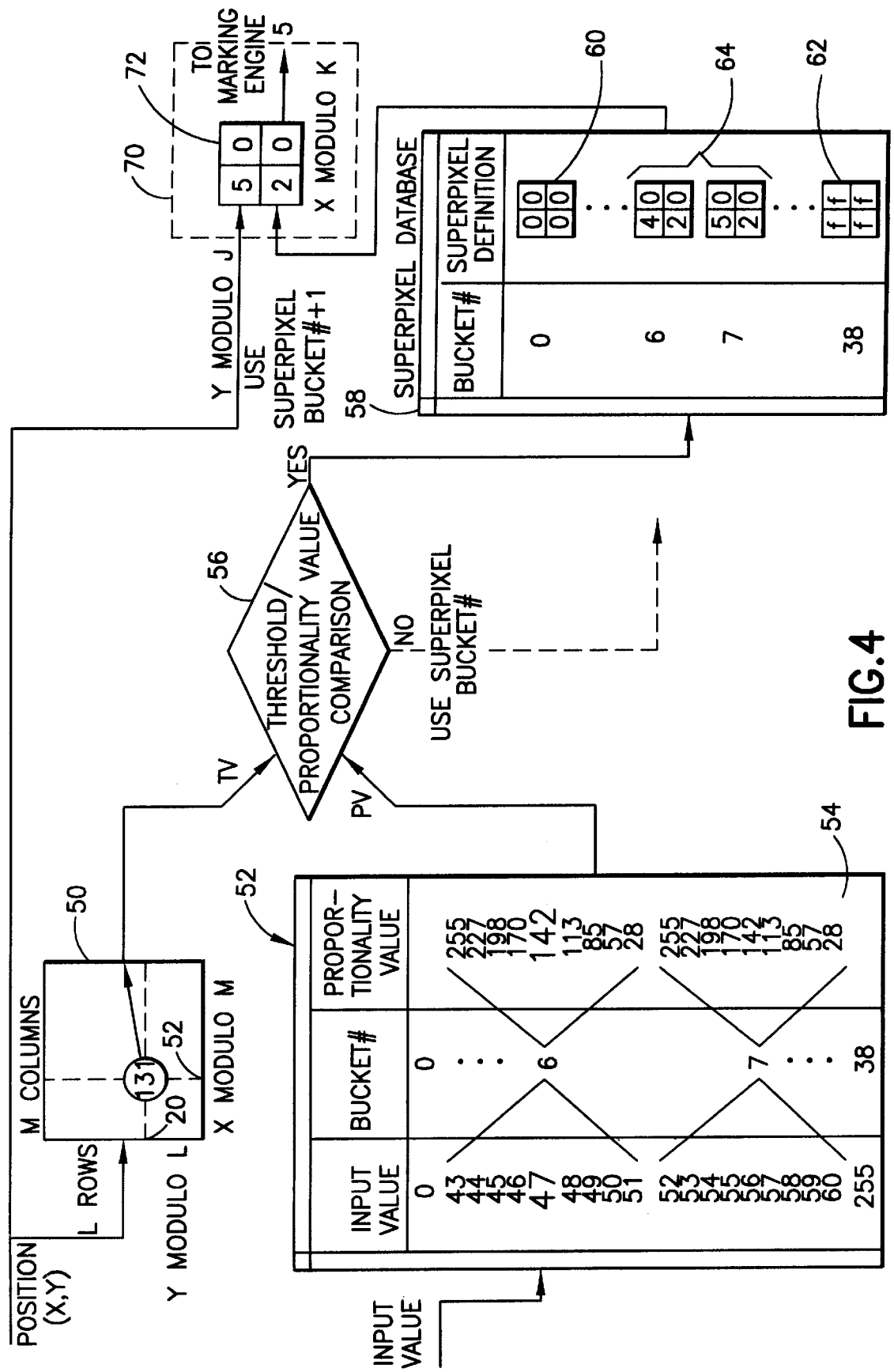
FIG. 4 is a schematic representation of logical operations carried out by the halftone circuit of FIG. 1.

Turning now to FIG. 4, the functions carried out by halftone ASIC under control of halftone procedure 22 will be described. For the purposes of the following description, it is assumed that a dither matrix 50 is utilized which comprises 128 rows by 128 columns of threshold values. Each threshold value lies between 0 and 255. Dither matrix 50 is preferably organized so that its threshold values represent a pseudo-random proportionality matrix with no detectable stitch artifacts.

Within halftone ASIC 18 is a table 52 which enables a quantization of each input image pixel value to be made. In specific, a determination is made of which of a plurality of buckets of color values an input image pixel value falls. If it is assumed that the input image pixel value is 47 (e.g., on a scale of 0–255), the image pixel value falls within subset 6 (hereinafter referred to as bucket 6) of the image pixel values. Note that bucket 6 encompasses grey level pixel values extending from 43 to 51, whereas bucket 7 comprises pixels having grey values from 52 to 60, etc.

Table 52 includes a proportionality value assignment section 54 which provides a proportionality value output that is indicative of the position occupied by the input pixel value in regards to all of the pixel values within its assigned bucket. Note that each proportionality value extends from 0 to 255 for each bucket. Thus, assuming the input pixel value of 47 has been assigned to bucket 6, the value 47 falls midway between the lowermost value in bucket 6, i.e., 43 and the uppermost value in bucket 6, i.e., 51. Accordingly, on a scale of 0–255, its position is converted to a proportionality value of 142 which is outputted to a comparator function 56.

When an image grey level pixel value is received by threshold dither matrix 50, the xy coordinate values of the image pixel are utilized to select a particular threshold value from dither matrix 50. Based on the assumption that threshold dither matrix 50 is 128 by 128 threshold values, the x position of the threshold value is determined by;

"x modulo 128"

or 52 modulo 128 or

52/128=0, with a remainder 52.

In similar fashion, the y position in threshold dither matrix 50 is determined by the expression: y modulo 128. Assuming that the y coordinate value of the input image pixel is y=148, then y modulo 128=148/128 or 1 with a remainder of 20.

Accordingly, a threshold value at y=20, x=52 is selected from dither matrix 50 and, for the purposes of the example shown in FIG. 4, that value is assumed to be 131.

The accessed threshold value of 131 is passed to comparator function 56 where it is compared with the proportionality value of 142 to determine whether the proportionality value is greater than the threshold value. As will be hereafter understood, the comparison of the proportionality and threshold values enables a choice to be made as to which of a plurality of superpixels will be used to determine the ultimate pixel gray scale value to be used in the halftone image.

While it is to noted that Table 52 enables quantization of an input image pixel value into one of 38 buckets, that number of gray levels, when rendered into an image by a laser print engine, is insufficient to provide a fully satisfactory continuous tone gray level image. Preferably, 100 to 120 buckets of gray levels are preferred to enable display of a continuous tone image.

It has been determined that a substantially improved halftone presentation can be achieved by (I) determining the relative position of the image pixel gray value in its assigned bucket and (ii) utilizing the threshold comparison function to determine which bucket value (and associated superpixel) should be used to produce the final halftone value. More specifically, if comparator function 56 finds the proportionality value exceeds the threshold value, then the assigned bucket value is incremented by 1. Whereas if the proportionality value is equal to or less than the threshold value, the bucket number remains as initially allocated.

The use of the proportionality value, in combination with the threshold value from threshold matrix 50, enables vernier changes to be made to the halftone pixel assignments, resulting in an improved halftone representation of the final rendered image.

Halftone ASIC 18 includes a superpixel data base which includes one superpixel per bucket value. A superpixel is a 2×2 or 3×3, . . . grouping of pixel values, each pixel value having an assigned gray value. The number of levels of gray assigned to each pixel in a superpixel is determined by the number of bits per pixel which can be accommodated by printer 10. In this example, it will be assumed that 4 bits are utilized to represent the gray level of each pixel within a superpixel, thereby enabling from 0–15 gray values to be represented, i.e., from 0-to-f (hexadecimal notation).

The arrangement of gray values in each superpixel may be chosen by the designer in accord with the ultimate dither representation to be applied to the rendered image. In superpixel database 58, the superpixels vary linearly from the 0'th superpixel to the 38th superpixel. More specifically, assuming that each superpixel is a 2×2 matrix, a superpixel 60 evidences all white values (0's) whereas a superpixel 62 includes all black values (f's). Intervening superpixels 64 have pixel values which provide a linear change in gray value with increasing bucket number.

Depending upon the bucket number issuing from comparator function 56, a corresponding superpixel is accessed from superpixel data base 58. If an accessed superpixel were to be fed, as is, to laser print engine 14, either a substantial expansion of the image would result or steps would be required to be taken to reduce the resolution of the image to accommodate the superpixels. To avoid either of these eventualities, the selected superpixel is fed to a selection stage 70 wherein only of the pixels in the selected superpixel is chosen for transmission to laser print engine 14 (or to halftone raster image 28 in RAM 20), as the case may be.

The selection of which row and column define the pixel within a superpixel to be fed to laser print engine 14 is based upon the xy coordinate value of the original image pixel fed to threshold matrix 50. More specifically, the superpixel row is selected based upon the relationship y modulo J, where y=the y coordinate value of the image pixel and J=the number of pixels in the Y dimension of the superpixel. In the case of FIG. 4, J=2.

The selection of the column within the superpixel is calculated using the relationship x modulo K, where x=the x coordinate value of the image pixel, and K=the number of pixels in the X dimension of the superpixel. In the case of FIG. 4, K=2. Thus, for the example given above wherein the image pixel x, y coordinate values are 52 and 148, respectively, the relationships are as follows:

$y$ modulo $J$=148 modulo 2=148/2=74, remainder 0.

$x$ modulo $K$=52 modulo 2=52/2=26, remainder 0.

From the above, it can be seen that pixel 72, which resides at the 0th row and 0th column in superpixel 74 is the selected pixel which is output to laser print engine 14. Thus, while superpixel 74 is employed to provide additional vernier gray level adjustment in accordance with the proportionality value, the final selection of the pixel from the selected superpixel results in the resolution of the original image being retained, while achieving an improved gray level halftoning results.

Those skilled in the art will understand that the arrangement of threshold values in threshold matrix 50; the assignment of pixel values to specific buckets; and the arrangement of each superpixel in superpixel data base 58 may be individually adjusted in accordance with desired rendering objectives of the ultimate image. Since laser printers can often exhibit different characteristics when rendering individual color planes (as compared to other color planes), such rendering inconsistencies can be corrected by employing a different threshold matrix, proportionality index or superpixel database for each individual color plane, with the aforementioned values being adjusted so as to compensate for the inconsistent color plane renderings which otherwise would occur.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Print apparatus for performing a halftoning action on a raster pixel image, wherein said print apparatus includes a print engine and a memory for storing said raster pixel image, each pixel represented by one or more gray level values between 0 and N−1, where N is an integer dependent upon a number of bits representing gray level values, said halftoning action employing a dither matrix of threshold values, said print apparatus comprising:

a) means for logically tiling said threshold matrix across said raster pixel image and for outputting a threshold value which logically, positionally, corresponds to a given image pixel color value;

b) means for quantizing said given image pixel color value to a selected subset of pixel color values which encompass said given image pixel color value;

c) means for deriving a proportionality value which identifies a relative position of said given image pixel color value within a range of pixel color values in said selected subset;

d) comparison means for comparing said threshold value output from means a) and said proportionality value derived by means c), and for incrementing said selected subset of pixel values to a next sequential subset if said proportionality value exceeds said threshold value;

e) a superpixel data base for storing plural n×m superpixels, each superpixel corresponding to a subset of pixel values;

f) decision means for selecting from a superpixel that corresponds to said selected subset or said next sequential subset, as the case may be, a halftone pixel color value positioned in said superpixel at a location that is determinable from coordinates of said image pixel value; and g) means for feeding said halftone pixel color value to said print engine in lieu of said image pixel value.

2. The print apparatus as recited in claim 1, wherein said memory stores at least three raster pixel image color planes, enabling each pixel to be represented by three color values, said print apparatus further including a stored dither matrix of threshold values for each color plane, said means for logically tiling employing a dither matrix associated with a selected color plane when engaged in said halftoning action with respect to pixel color values stored in said selected color plane.

3. The print apparatus as recited in claim 1, wherein said memory stores at least three raster pixel image color planes, enabling each pixel to be represented by three color values, said print apparatus further including a stored table including subsets of pixel color values for each said color plane, said means for quantizing employing a subset of pixel color values associated with a selected color plane when engaged in said halftoning action with respect to pixel color values stored in said selected color plane.

4. The print apparatus as recited in claim 1, wherein each image pixel in said raster pixel image resides at an X,Y coordinate position and said decision means employs X modulo n and Y modulo m to select said halftone pixel color value from said selected superpixel.

5. The print apparatus as recited in claim 1, wherein said means a)–means d) and means f) operate on each pixel in said pixel image.

6. A method for enabling a print apparatus to perform a halftoning action on a raster pixel image, wherein said print apparatus includes a print engine, a superpixel data base for storing plural n×m superpixels, each superpixel corresponding to a subset of pixel values, and a memory for storing said raster pixel image, each pixel represented by one or more gray level values between 0 and N−1, where N is an integer dependent upon a number of bits in a gray level value, said halftoning action employing a dither matrix of threshold values, said method comprising the steps of:

a) logically tiling said dither matrix across said raster pixel image and outputting a threshold value which logically, positionally, corresponds to a given image pixel value;

b) quantizing said given image pixel value to a selected subset of pixel values which encompass said given image pixel value;

c) deriving a proportionality value which identifies a relative position of said given image pixel value within a range of pixel values in said selected subset of pixel values;

d) comparing said outputted threshold value and said proportionality value and incrementing said selected subset of pixel values to a next sequential subset if said proportionality value exceeds said threshold value;

e) selecting from a superpixel that is associated with said selected subset or next sequential subset, as the case may be, a halftone pixel color value positioned in said superpixel at a location that is determinable from coordinates of said image pixel value; and f) feeding said halftone pixel color value to said print engine in lieu of said image pixel value.

7. The method as recited in claim 6, wherein each image pixel in said raster pixel image resides at an X,Y coordinate position and step e) employs X modulo n and Y modulo m to select said halftone pixel color value from said selected superpixel.

* * * * *